(12) United States Patent
Nettleton et al.

(10) Patent No.: US 7,428,252 B1
(45) Date of Patent: Sep. 23, 2008

(54) UNSTABLE MONOBLOCK LASER CAVITY WITH INTEGRATED BEAM EXPANDER

(75) Inventors: John E. Nettleton, Fairfax Station, VA (US); Dallas N. Barr, Woodbridge, VA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 22 days.

(21) Appl. No.: 11/686,348

(22) Filed: Mar. 14, 2007

(51) Int. Cl.
*H01S 3/11* (2006.01)

(52) U.S. Cl. .............................. 372/10; 372/21; 372/101
(58) Field of Classification Search ..................... 372/19
See application file for complete search history.

(56) References Cited

U.S. PATENT DOCUMENTS

| 5,181,211 | A  | * | 1/1993  | Burnham et al. | ............... | 372/21 |
| 6,356,575 | B1 | * | 3/2002  | Fukumoto | ..................... | 372/97 |
| 2006/0280221 | A1 | * | 12/2006 | Seitel | ......................... | 372/100 |

* cited by examiner

*Primary Examiner*—Dung T Nguyen
(74) *Attorney, Agent, or Firm*—Andrew Romero; John Raubitschek

(57) ABSTRACT

A monoblock laser cavity includes a plurality of discrete optical components disposed serially on a substrate and sharing a common optical axis. The optical components include a laser rod of gain material, a Q-switch, an OPO crystal, an output coupler, and a positive lens. The output coupler has a convex input end face and a concave output end face, and acts as the expanding lens element of a beam expander, and the positive lens completes the beam expander to improve the beam quality.

16 Claims, 1 Drawing Sheet

UNSTABLE MONOBLOCK LASER CAVITY WITH INTEGRATED BEAM EXPANDER

GOVERNMENT INTEREST

The invention described herein may be manufactured, used, sold, imported, and/or licensed by or for the Government of the United States of America.

FIELD OF THE INVENTION

The present invention generally relates to lasers, and more particularly, to unstable monoblock laser cavities with integrated beam expanders.

BACKGROUND OF THE INVENTION

Laser rangefinders are becoming an increasingly vital component in high precision targeting engagements. The precise and accurate range to target information is an essential variable to the fire control equation of all future soldier weapons. This information is provided easily, and in a timely manner, by laser range finders.

Current fielded laser range finders are bulky, heavy and expensive. These laser range finders were not developed with the individual soldier and his special needs in mind.

The monoblock laser cavity (a laser subassembly, which lacks only an optical pump) described in U.S. Pat. No. 6,373,865, whose disclosure is hereby incorporated by reference, makes the development and fabrication of a very low cost, compact laser range finder feasible. The monoblock laser cavity incorporates all of the optical components required for a short-pulse laser on a thin substrate of the same or thermally equivalent material. These optical components are "locked" into alignment forming an optical laser cavity for flash lamp or diode laser pumping. The optical laser cavity never needs optical alignment after it is fabricated. The beam divergence of the monoblock laser is rather large (>8 mrad) (low brightness laser) which means a sizable optical system is required to collimate the monoblock laser output.

Referring to the drawings, FIG. 1 shows a conventional monoblock laser cavity 10. The monoblock laser cavity 10 is made up of a plurality of discrete optical elements which are disposed serially on a substrate 11 and which share a common optical axis 13. The typical cross-section is square or rectangular, even though it can take various other forms. The optical components are bonded into one "block," hence the name "monoblock." The optical elements include a laser rod 15 of gain material, a passive Q-switch 17, an optical parametric oscillator (OPO) 19, and an output coupler 21.

The laser rod 15 has a uniform slit 22 sliced through it at the Brewster angle to the optical axis 13, thus producing two polarizing rod elements 23 and 25 from the single rod of gain material. The high reflector (HR) 26 at the laser emission wavelength (e.g., 1064 nm) is coated on the input end face 27 of the laser rod 15.

A high reflector (HR) 28 at a laser emission wavelength (e.g., 1064 nm) and a partial reflector (PR) 29 at an OPO wavelength (e.g., 1570 nm) are coated on the output end face 30 of the output coupler 21. The HR coatings 26 and 28 act as the two mirrors defining an optical resonator.

The monoblock laser cavity 10 shown in FIG. 1 is a flat-flat or stable resonator design. This design is acutely sensitive to any angular deviations of the mirrors from the optical axis. It also allows high order modes of lasing to occur which leads to poor beam quality. Note that the conventional monoblock laser cavity is lengthened in an attempt to improve beam quality. The beam divergence from a flat-flat cavity is very weakly affected by cavity length.

SUMMARY OF THE INVENTION

It is therefore an object of this invention to improve the beam quality of the monoblock laser.

This and other objects of the invention are achieved in one aspect by a monoblock laser cavity comprising a plurality of discrete optical components disposed serially on a substrate and sharing a common optical axis. The optical components include a laser rod of gain material, a Q-switch, an OPO crystal, an output coupler, and a positive lens. The output coupler has a convex input end face and a concave output end face, and acts as the expanding lens element of a beam expander, and the positive lens completes the beam expander.

Another aspect of the invention involves a method of making a monoblock laser cavity comprising the steps of disposing a plurality of discrete optical components serially on a substrate so as to share a common optical axis, the optical components including a laser rod of gain material, a Q-switch, an OPO crystal, an output coupler, and a positive lens, and designing the output coupler so that the output coupler has a convex input end face and a concave output end face, and acts as the expanding lens element of a beam expander, with the positive lens completing the beam expander.

The beam expander reduces the beam divergence of the monoblock laser. This permits use of a smaller diameter optical system to collimate the laser output for use in a laser range finder.

The monoblock laser cavity is smaller and more compact than the current monoblock laser cavity. It requires a smaller external telescope, or if the same external telescope is used, than it has a much tighter beam divergence.

The monoblock laser cavity is still a simple module that requires none of the labor-extensive alignment procedures as current laser range finder-solid state sources. It is much more insensitive to angular deviations than the original flat-flat design which simplifies the manufacturing process. No optical holders have to be fabricated, no complex engineering is required to design the optical cavity, and no precise laser cavity alignments are required. Production labor and material costs are greatly reduced.

The monoblock laser cavity is a modular component. The modularity lends to ease of design for different pump sources. It can be incorporated in a flash lamp pumped or laser diode pumped system.

The monoblock laser cavity can be used as the laser source in very compact laser range finders. It generates eye safe laser output for eye safe laser range finding. These laser range finders have both military and commercial applications. The compact design of the monoblock laser cavity also lends itself to placement in other laser-based portable and hand-held devices. These include medical devices, industrial tools or scientific equipment that can benefit from the size and weight reduction, dependable performance, and low cost.

To the accomplishment of the foregoing and related ends, the invention provides the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the detailed description that follows, identical components have been given the same reference numerals.

DETAILED DESCRIPTION

Figure 1:
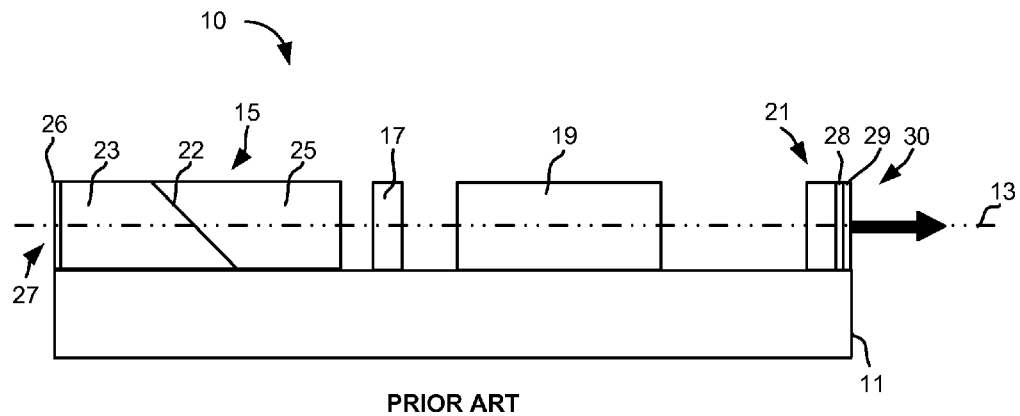
FIG. 1 shows a conventional monoblock laser cavity.
Figure 2:
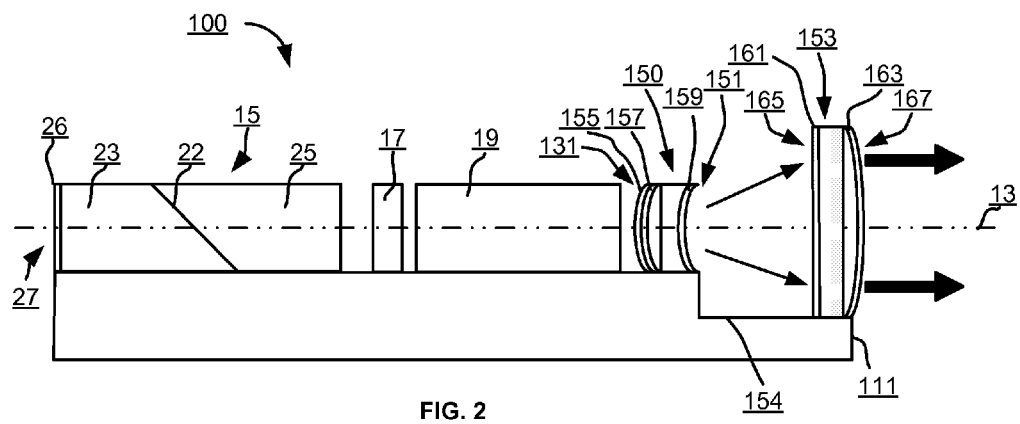
FIG. 2 shows a monoblock laser cavity of the present invention.

Referring now to the drawings, FIG. 2 shows a monoblock laser cavity 100 in accordance with the invention. Similar to the monoblock laser cavity 10, the monoblock laser cavity 100 is made up of a plurality of discrete optical elements which are disposed serially on the substrate 111 and share a common optical axis 13. The typical cross-section is square or rectangular, even though it can take various other forms. The optical components are bonded into a "monoblock." The monoblock laser cavity 100 includes the following optical elements of the monoblock laser cavity 10 described above; the laser rod 15 of gain material, the passive Q-switch 17 and the OPO 19. However, a different output coupler 150, described below in further detail, is used.

The laser rod 15 has a uniform slit 22 sliced through it at the Brewster angle to the optical axis 13, thus producing two polarizing rod elements 23 and 25 from the single rod of gain material. The high reflector (HR) 26 at the laser emission wavelength (e.g., 1064 nm) is coated on the input end face 27 of the laser rod 15.

Preferably, the material of the substrate 111 is YAG, YLF, $YVO_4$, etc.; to achieve a thermal expansion match with the material of the laser rod 15, also Nd:YAG, Nd:YLF, Nd:$YVO_4$, etc. as well as other active ions such as Erbium (Er); and the material of the Q-switch is Cr4+:YAG or other suitable materials for the alternative gain crystals. The laser emission wavelength may be 1064 nm for Nd:YAG and other wavelengths for other materials, and the OPO wavelength may be an eye-safe 1500-1570 nm or any other wavelength that can be achieved through nonlinear crystal operation.

The output coupler 150 includes a convex input end face 131 and a concave output end face 151, and a positive lens 153. The output coupler 150 acts as the expanding lens element of a beam expander, and the positive lens 153 completes the beam expander. A shelf 154 on the base 111 is sized to assure the laser axis coincides with the center of the lens 153. A high reflector (HR) 155 at a laser emission wavelength (e.g., 1064 nm) and a partial reflector (PR) 157 at an OPO wavelength (e.g., 1570 nm) are coated on the convex input end face 131 of the output coupler 150. Anti-reflectors (AR) 159, 161 and 163, respectively, at the OPO emission wavelength (e.g., 1570 nm) are coated on the concave output end face 151 of the output coupler 150, and on both end faces 165 and 167 of the positive lens 153.

The monoblock laser cavity is now a flat-convex or unstable cavity. It is less sensitive than the flat-flat cavity to angular deviations of the mirrors with respect to the optical axis. This design also mitigates the number of modes allowed to propagate within the laser cavity (the higher order mode are subjected to more loss) so that the output leaving the laser cavity consists of the lower order modes, resulting in better beam quality. The output coupler 150 and the positive lens 153 can be fabricated out of YAG, YLF, $YVO_4$, etc. to match the expansion coefficient of the other items in the monoblock laser.

The overall output energy of the unstable laser cavity is slightly less than that of the stable, flat-flat, laser cavity (how much depends on the size of the curvature selected for the convex side of the output coupler). But the achievable far field beam divergence is much, much less.

Although the invention has been shown and described with respect to certain preferred embodiments, it is obvious that equivalent alterations and modifications will occur to others skilled in the art upon the reading and understanding of this specification and the annexed drawings. In particular regard to the various functions performed by the above described components (assemblies, devices, sensors, circuits, etc), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments as may be desired and advantageous for any given or particular application.

What is claimed is:

1. A monoblock laser cavity comprising:
a plurality of discrete optical components disposed serially on a substrate and sharing a common optical axis, the optical components including a laser rod of gain material, a Q-switch, an OPO crystal, and an output coupler, and a positive lens,
wherein the output coupler has a convex input end face and a concave output end face, and acts as an expanding lens element of a beam expander, and the positive lens completes the beam expander.

2. The monoblock laser cavity recited in claim 1 wherein the material of the substrate is YAG.

3. The monoblock laser cavity recited in claim 1 wherein the material of the laser rod is Nd:YAG.

4. The monoblock laser cavity recited in claim 1 wherein the material of the Q-switch is Cr4+:YAG.

5. The monoblock laser cavity recited in claim 1 wherein the laser rod has an input end face, and a high reflector at the laser emission wavelength is coated on the input end face of the laser rod.

6. The monoblock laser cavity recited in claim 1 wherein a high reflector at the laser emission wavelength and a partial reflector at the OPO wavelength are coated on the convex input end face of the output coupler.

7. The monoblock laser cavity recited in claim 1 wherein anti-reflectors at the OPO wavelength are coated on the concave output end face of the output coupler.

8. The monoblock laser cavity of claim 1 wherein the positive lens has a pair of end faces, and an anti-reflector at the OPO wavelength is coated on both end faces of the positive lens.

9. The monoblock laser cavity recited in claim 5 wherein the laser emission wavelength is 1064 nm.

10. The monoblock laser cavity recited in claim 6 wherein the laser emission wavelength is 1064 nm and the OPO wavelength is 1570 nm.

11. The monoblock laser cavity recited in claim 7 wherein the OPO wavelength is 1570 nm.

12. The monoblock laser cavity recited in claim 8 wherein the OPO wavelength is 1570 nm.

13. The monoblock laser cavity recited in claim 6 wherein the OPO wavelength is an eye-safe 1570 nm.

14. The monoblock laser cavity recited in claim 1 wherein the material of the output coupler is YAG.

15. A monoblock laser cavity comprising:

a plurality of discrete optical components disposed serially on a YAG substrate and sharing a common optical axis, the optical components including a Nd:YAG laser rod of gain material, a Cr4+YAG passive Q-switch, an OPO crystal, a YAG output coupler, and a YAG positive lens, wherein the output coupler has a convex input end face and a concave output end face, and acts as an expanding lens element of a beam expander, and the positive lens completes the beam expander; a high reflector at 1064 nm wavelength and a partial reflector at 1570 nm wavelength are coated on the convex input end face of the output coupler; an anti-reflector at 1570 nm wavelength is coated on the concave output end face of the output coupler; and the positive lens has a pair of end faces, and an anti-reflector at 1570 nm wavelength is coated on both end faces of the positive lens.

16. A method of making a monoblock laser cavity comprising the steps of:

disposing a plurality of discrete optical components serially on a substrate so as to share a common optical axis, the optical components including a laser rod of gain material, a Q-switch, an OPO crystal, an output coupler, and a positive lens; and designing the output coupler so that the output coupler has a convex input end face and a concave output end face, and acts as an expanding lens element of a beam expander, with the positive lens completing the beam expander.

* * * * *